(12) United States Patent
Patel

(10) Patent No.: US 7,957,533 B2
(45) Date of Patent: Jun. 7, 2011

(54) METHOD OF ESTABLISHING AUTHENTICATION KEYS AND SECURE WIRELESS COMMUNICATION

(75) Inventor: Sarvar Patel, Montville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 867 days.

(21) Appl. No.: 11/905,540

(22) Filed: Oct. 2, 2007

(65) Prior Publication Data

US 2009/0089583 A1 Apr. 2, 2009

(51) Int. Cl.
*H04K 1/00* (2006.01)
(52) U.S. Cl. .................................. 380/270; 713/168
(58) Field of Classification Search .............. 380/270; 713/168
See application file for complete search history.

(56) References Cited

FOREIGN PATENT DOCUMENTS

EP 1 001 570 5/2000

OTHER PUBLICATIONS

J.S. Stach et al., "An Enhanced Authentication Protocol for Personal Communication Systems," Application-Specific Software Engineering Technology, 1998. Asset-98. Proceedings. 1998 IEEE Workshop on Richardson, TX, USA Mar. 26-28, 1998, Los Alamitos, CA, USA, IEEE Comput. Soc, US, Mar. 26, 1998, pp. 128-132, XP010289105, ISBN: 978-0-8186-8582-8 p. 131-132.
International Search Report and Written Opinion dated Jan. 9, 2009.
International Preliminary Examination Report dated Apr. 15, 2010.

*Primary Examiner* — Christopher J Brown
(74) *Attorney, Agent, or Firm* — Harness, Dickey & Pierce, P.L.C.

(57) ABSTRACT

A method of establishing authentication keys at both a network and mobile equipment are provided. The authentication key generated by the mobile equipment is based on both mobile keys and network keys, which are each calculated by the mobile equipment. The authentication key generated by the network is based on both mobile keys and network keys, which are each calculated by the network. The mobile keys are calculated from a challenge generated by the mobile equipment and the network keys generated by the mobile based on a challenge generated by network.

21 Claims, 9 Drawing Sheets

METHOD OF ESTABLISHING AUTHENTICATION KEYS AND SECURE WIRELESS COMMUNICATION

BACKGROUND

1. Field the of the Invention

The present invention relates to a method and system for secure wireless communications. In particular, example embodiments relate to a method of establishing authentication keys at both the network and mobile equipment in order to establish a mutually authenticated communication channel.

2. Description of Related Art

Security methods and processes relating to wireless communications have evolved in recent years. In particular, 2G CDMA security evolved into 3G CDMA security, and many of the same characteristics of 3G CDMA security are now incorporated new systems such as IMS systems, for example.

As is well known in the art, 2G CDMA security involves cellular authentication and voice encryption (CAVE). In particular, 2G CDMA security uses at least a root key commonly referred to as an AKey and shared secret data (SSD) keys. The SSD keys are generated via a well-known SSD update procedure. The SSD keys are semi long term keys and are treated as root keys herein. The SSD keys may be shared with a Visitor Location Register (VLR) of a network if the VLR is the Home Serving System, for example. Further, conventional 2G CDMA security protocols may involve a global challenge and response procedure and a unique challenge and response procedure.

For the global challenge procedure, the network broadcasts a random challenge RAND to the mobile equipment. A mobile equipment performing system access (e.g. registration, call origination, and call termination) in a network that requires authentication, creates and sends an authentication response AUTHR using a long term key. The pair RAND/AUTHR is forwarded to the Home Location Register/Authentication Center (HLR/AC) for verification. Also for calls of type call origination, last 6 digits are used in calculating AUTHR. For both call origination and call termination the mobile generates keys that are useful for the call (i.e SMEKEY and PLCM). The HLR/AC returns to the VLR the SMEKEY and PLCM if the RAND/AUTHR pair verifies.

A unique challenge procedure can be performed by the network towards a mobile equipment at any time on either the control or traffic channel. For example, the VLR requests a unique challenge and expected response pair, RANDU and AUTHU from the HLR/AC. The network sends the RANDU to the mobile equipment and the mobile equipment calculates a response AUTHU using a long term key and sends a response AUTHU to the network. The network verifies the RANDU/AUTHU pair.

Conventional 3G CDMA security protocols are based on an authentication key agreement (AKA) and provide mutual authentication meaning (i) the mobile equipment authenticates the network and (ii) the network authenticates the mobile equipment before communications are performed. The well-known AKA security protocols used in 3G CDMA are based on quintuplets. Quintuplets include a random number RAND, expected response XRES, cipher key CK, integrity key IK and network authentication token AUTN. A conventional network authentication token AUTN is based on a sequence number SQN, an anonymity key AK, authentication management field AMF and a message authentication code MAC.

For example, the mobile equipment generates its own message authentication code MAC based on a sequence number SQN stored in the mobile equipment, a secret key K stored in the mobile equipment, the AMF, and the random number RAND. Then, the message authentication code MAC generated at the mobile equipment is compared with the MAC extracted from the network authentication token AUTN received from the serving system. Still further, the mobile equipment may determine if the sequence number SQN extracted from the network authentication token is an acceptable value. If the mobile equipment successfully authenticates the network, the mobile equipment prepares a response RES and transmits the response RES back to the serving system of the network. The serving system of the network then compares the expected response XRES with the response RES to authenticate the mobile equipment, thereby completing a mutual authentication according to the conventional AKA security protocol.

If the mobile equipment during the authentication process determines the message authentication code MAC, which was extracted from the network authentication token AUTN, does not match the MAC generated in the mobile equipment, the mobile equipment transmits a failure message to the serving system of the network. Further, if the mobile equipment during the authentication process determines the MAC value, which was extracted from the network authentication token AUTN matches the MAC value generated by the mobile equipment, but that the sequence number SQN is outside of the permissible range, the mobile equipment transmits a resynchronization message to the network. The AKA security protocol briefly described above and used in 3G CDMA is well known in the art and thus, further information is not provided herein for the sake of brevity.

While security protocols have evolved by transitioning from 2G CDMA security protocols to 3G CDMA security protocols, which are also implemented in some conventional IMS security protocols, some of the hardware equipment used for wireless communications has not been updated and/or is not capable of processing the more highly evolved protocols. For example, some companies which may have invested significant amounts of time, research and money in hardware used to process 2G CDMA security protocols have chosen not to update the hardware for various cost associated reasons. Therefore, some conventional 2G CDMA hardware devices are not currently capable of providing a mutually authenticated communication channel using the AKA security protocols of conventional 3G CDMA.

Accordingly, proposals have been made, which attempt to establish a mutually authenticated communication channel without using the quintuplet based AKA security protocol described above with respect to 3G CDMA. Stated differently, these proposals are attempting to use IS-41 authentication procedures previously used in 2G CDMA security protocols. However, all of these proposals suffer from at least the following deficiency. In particular, a compromise of a past IS-41 session key (e.g., SMEKEY and PLCM) would allow an attacker to replay a random number and successfully complete the key agreement protocol and communicate with a mobile equipment or a network. As such, these proposals are insecure when a previously used IS-41 session key is revealed.

SUMMARY

Example embodiments provide methods and apparatuses related to establishing communications between mobile equipment and a network that leverages ANSI-41 security protocols.

An example embodiment provides a method performed by a mobile equipment to communication with a network that leverages ANSI-41 security protocols. The method includes receiving a first challenge from the network; calculating a network authorization response and network keys based on the received first challenge; generating a second challenge; calculating a mobile authorization response and mobile keys based on the generated second challenge; and obtaining an authentication key based on the mobile keys and the network keys calculated by mobile equipment.

According to an example embodiment, the method may further include generating a mobile authentication code based on the authentication key; sending the second challenge, the network authorization response, the mobile authorization response, and the mobile authentication code to the network; receiving a network message authentication code from the network; generating a network message authentication code based on the first challenge and the authentication key; and establishing a communication channel between the mobile equipment and the network if the network message authentication code received from the network matches the network message authentication code generated at the mobile equipment.

According to an example embodiment, a UIM of the mobile equipment calculates the network authorization response and network keys using the first challenge and a value of a secret key stored in the UIM of the mobile equipment, and calculates the mobile authorization response and mobile keys using the second challenge and a value of a secret key stored in the UIM of the mobile equipment.

According to an example embodiment, the mobile keys and the network keys include a PLCM and SMEKEY. Further, the authentication key includes a hash of the mobile keys and the network keys. Still further, the first and second challenges are first and second random numbers, respectively.

According to an example embodiment, a UIM of the mobile equipment receives a call type indicator indicating a call origination and additional bits allocated to the first challenge to effectively increase a length of the first challenge along with the first challenge, and calculates the network authorization response and the network keys using the first challenge, the additional bits, and a value of a secret key stored in the UIM of the mobile equipment, and receives the call type indicator indicating a call origination and additional bits allocated to the second challenge to effectively increase a length of the second challenge along with the second challenge, and calculates the mobile authorization response and the mobile keys using the second challenge, the additional bits allocated to the second challenge, and a value of a secret key stored in the UIM of the mobile equipment.

According to an example embodiment, a UIM of the mobile equipment receives the first challenge along with last call digits, and calculates the network authorization response and the network keys using the first challenge, the bits of the last call digits, and a value of a secret key stored in the UIM of the mobile equipment, and receives the second challenge along with last call digits, and calculates the mobile authorization response and the mobile keys using the second challenge, the last call digits, and a value of a secret key stored in the UIM of the mobile equipment. The last call digits are a number that is not callable by the mobile equipment.

According to an example embodiment, a pair of the first challenge and network authorization response or a pair of the second challenge and mobile authorization response are used in a subsequent protocol run to generate a PLCM and SMEKEY.

Another example embodiment provides a method performed by a mobile equipment to communicate with a network that leverages ANSI-41 security protocols. The method includes generating a first challenge; calculating a mobile authorization response and mobile keys based on the generated first challenge; sending the first challenge and the mobile authorization response to the network; receiving a second challenge from the network; calculating a network authorization response and network keys based on the second challenge; and generating an authentication key based on the mobile keys and network keys calculated by the mobile equipment.

According to an example embodiment, the method further includes receiving a network message authentication code from the network; generating a network message authentication code at the mobile based on the second challenge and the authentication key; generating a mobile message authentication code if the generated network message authentication code matches the received network message authentication code; and sending the mobile message authentication code to the network in an attempt to establish a mutually authenticated communication channel with the network.

According to an example embodiment, a UIM of the mobile equipment calculates the mobile authorization response and mobile keys using the first challenge and a value of a secret key stored in the UIM of the mobile equipment, and calculates the network authorization response and network keys using the second challenge and a value of a secret key stored in the UIM of the mobile equipment.

According to an example embodiment, a UIM of the mobile equipment receives a call type indicator indicating a call origination and additional bits allocated to the first challenge to effectively increase a length of the first challenge along with the first challenge, and calculates the mobile authorization response and the mobile keys using the first challenge, the additional bits, and a value of a secret key stored in the UIM of the mobile equipment, and receives the call type indicator indicating a call origination and additional bits allocated to the second challenge to effectively increase a length of the second challenge along with the second challenge, and calculates the network authorization response and the network keys using the second challenge, the additional bits-allocated to the second challenge, and a value of a secret key stored in the UIM of the mobile equipment.

According to an example embodiment, a UIM of the mobile equipment receives the first challenge along with last call digits, and calculates the mobile authorization response and the mobile keys using the first challenge, the last call digits, and a value of a secret key stored in the UIM of the mobile equipment, and receives the second challenge along with last call digits, and calculates the network authorization response and the network keys using the second challenge, the last call digits, and a value of a secret key stored in the UIM of the mobile equipment. The last call digits are a number that is not callable by the mobile equipment, such as 00000 or 01101, for example.

According to an example embodiment, a pair of the first challenge and mobile authorization response or a pair of the second challenge and network authorization response are used in a subsequent protocol run to generate a PLCM and SMEKEY.

Another example embodiment provides a method performed by a network to communicate with a mobile equipment that leverages ANSI-41 security protocols. The method includes sending a first challenge to the mobile equipment; receiving a network authorization response, a second challenge, and a mobile authorization response from the mobile equipment; calculating network keys based on the network authorization response received from the mobile and the first challenge; calculating mobile keys based on the second challenge and the mobile authorization response; and generating an authentication key based on the networks keys and the mobile keys calculated by the network.

According to an example embodiment, the method further includes receiving a mobile message authentication code from the mobile equipment; generating a mobile message authentication code at the network based on the second challenge and the authentication key; generating an network message authentication code if the generated mobile message authentication code matches the mobile message authentication code received from the mobile equipment; and sending the network message authentication code to the mobile equipment in an attempt to establish a mutually authenticated communication channel with the mobile equipment.

According to an example embodiment, an authentication center of the network receives a call type indicator indicating a call origination and additional bits allocated to the first challenge to effectively increase a length of the first challenge along with the first challenge, and calculates the network authorization response and the network keys using the first challenge, the additional bits, and a value of a secret key stored in the authentication center of the network, and receives the call type indicator indicating a call origination and additional bits allocated to the second challenge to effectively increase a length of the second challenge along with the second challenge, and calculates the mobile authorization response and the mobile keys using the second challenge, the additional bits allocated to the second challenge, and a value of a secret key stored in the authentication center.

According to an example embodiment, an authentication center of the network receives the first challenge along with last call digits, and calculates the network authorization response and the network keys using the first challenge, the last call digits, and a value of a secret key stored in the authentication center, and receives the second challenge along with last call digits, and calculates the mobile authorization response and the mobile keys using the second challenge, the last call digits, and a value of a secret key stored in the authentication center. The last call digits are a number that is not callable by the mobile equipment.

Still another example embodiment provides a method performed by a network to communicate with a mobile equipment that leverages ANSI-41 security protocols. The method includes receiving a first challenge and a mobile authorization response; calculating mobile keys based on the first challenge and the mobile authorization response; generating a second challenge and a network authorization response; calculating network keys based on the second challenge and the network authorization response; and generating an authentication key based on the mobile keys and network keys calculated by the network.

According to an example embodiment, the method further includes generating a network message authentication code based on the second challenge and the authentication key; sending the second challenge and the network message authentication code to the mobile equipment; receiving a mobile message authentication code from the mobile equipment; generating a mobile message authentication code at the network based on the first challenge and the authentication key; and establishing a mutually authenticated communication channel with the mobile equipment if the received mobile message authentication code matches the mobile message authentication code generated at the network.

According to an example embodiment, generating the second challenge and the network authorization response includes sending a unique challenge request from a HSS/VLR to a HLR/AC of the network; receiving unique challenge and a network authorization response from the HLR/AC of the network; and concatenating the unique challenge with a mobile equipment identification number to generate the second challenge.

According to an example embodiment, an authentication center of the network receives a call type indicator indicating a call origination and additional bits allocated to the first challenge to effectively increase a length of the first challenge along with the first challenge, and calculates the mobile authorization response and the mobile keys using the first challenge, the additional bits, and a value of a secret key stored in the authentication center, and receives the call type indicator indicating a call origination and additional bits allocated to the second challenge to effectively increase a length of the second challenge along with the second challenge, and calculates the network authorization response and the network keys using the second challenge, the additional bits allocated to the second challenge, and a value of a secret key stored in the authentication center.

According to an example embodiment, an authentication center of the network receives the first challenge along with last call digits, and calculates the mobile authorization response and the mobile keys using the first challenge, the last call digits, and a value of a secret key stored in the authentication center, and receives the second challenge along with last call digits, and calculates the network authorization response and the network keys using the second challenge, the last call digits, and a value of a secret key stored in the authentication center. The last call digits are a number that is not callable by the mobile equipment.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
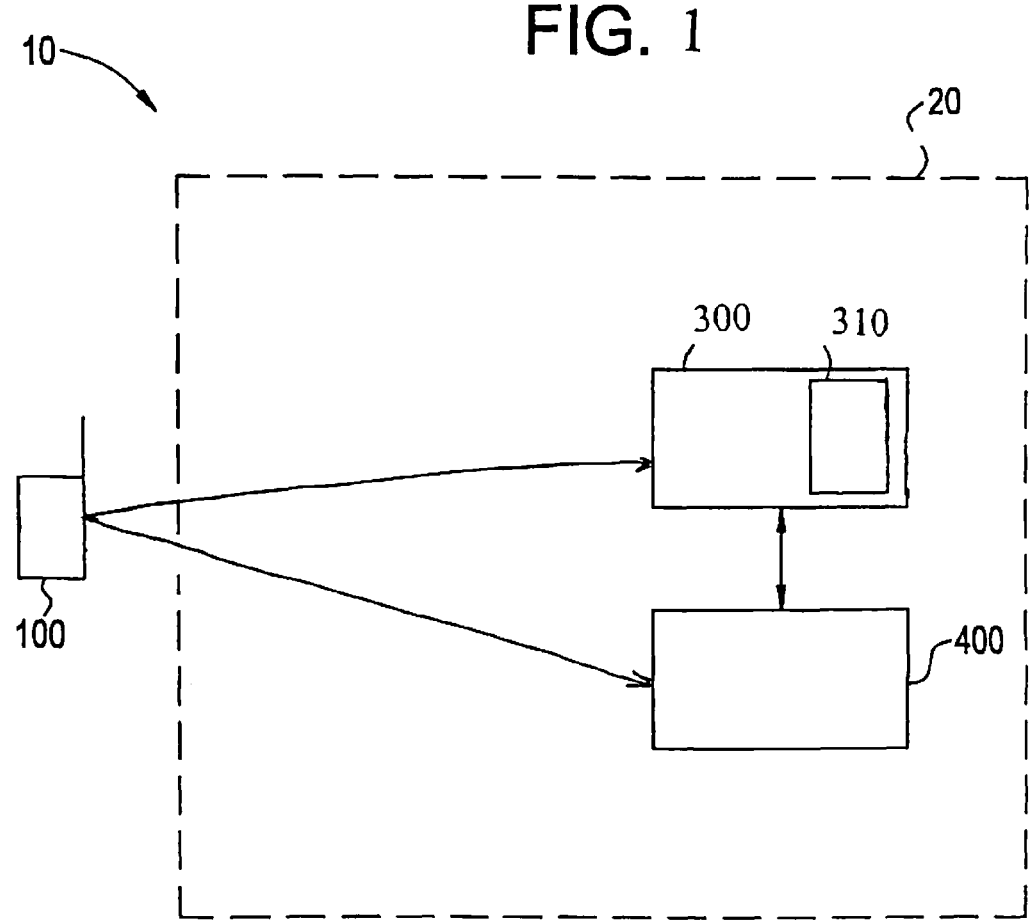
FIG. 1 illustrates a communication system according to an example embodiment.

FIG. 1 illustrates a communication system 10 including at least one mobile equipment 100 and a network 20. In FIG. 1, the network 20 includes a home location register (HLR) 300 and a visitor location register (VLR) 400. One skilled in the art will appreciate that the communication system 100 illustrated in FIG. 1 is simplified and would include various intermediary components used to communicate between the mobile equipment 100, the HLR 300 and the VLR 400. The location of the mobile equipment 100, type of service requested by the mobile equipment 100, etc., may determine whether the HLR 300 or the VLR 400 provides a requested service to the mobile equipment 100.

According to the example embodiment as described with respect to FIG. 1, the HLR 300 includes an authentication center (AC) 310. One skilled in the art will appreciate the HLR 300 and the AC 310 may be separate and distinct components of the communication system instead of the AC 310 being included with the HLR 300 as shown in FIG. 1. In the remainder of this application the HLR 300 and authentication center will be referred to collectively as a Home Location Register/Authentication Center (HLR/AC).

Figure 2:
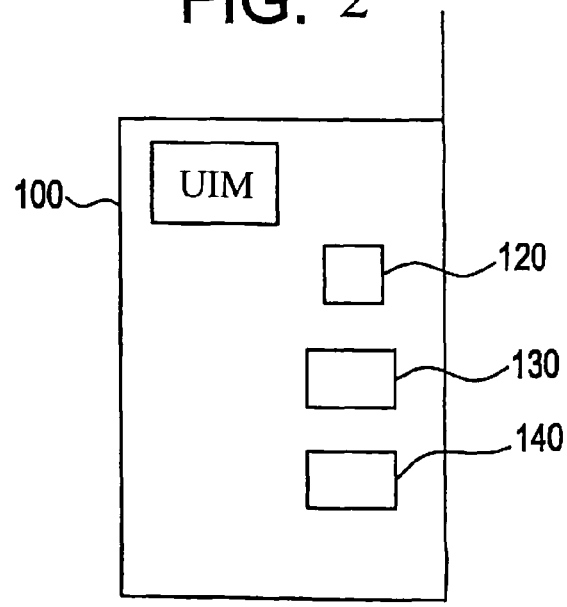
FIG. 2 illustrates an example embodiment of a mobile equipment.

FIG. 2 illustrates an example embodiment of mobile equipment 100. As shown in FIG. 2, the mobile equipment 100 includes a user identity module (UIM), a memory 120, a processor 130 and a transceiver 140. The UIM may be a conventional user identity module. Alternatively, one skilled in the art will appreciate the UIM of mobile equipment 100 could be a conventional removable user identity module (RUIM). For example, the UIM may be a module that was developed to function according to the 2G CDMA security protocols. As such, the UIM may store a MIN/IMSI/TMSI as is well known in the art and will not be discussed further herein for the sake of brevity.

The memory 120, the processor 130 and the transceiver 140 may be used in conjunction with the UIM to perform example embodiments of methods described below with respect to FIGS. 3-10. For ease of explanation, the memory 120, the processor 130 and the transceiver 140 are collectively referred to as ME in example embodiments described below. Accordingly, although the signal flow diagrams of FIGS. 3 and 6 illustrate the ME and the UIM as separate entities, one skilled in the art will appreciate that the UIM is actually inserted into or a component of the mobile equipment 100, and the ME (i.e., the memory 120, the processor 130 and the transceiver 140) is a component of the mobile equipment 100.

Figure 3:
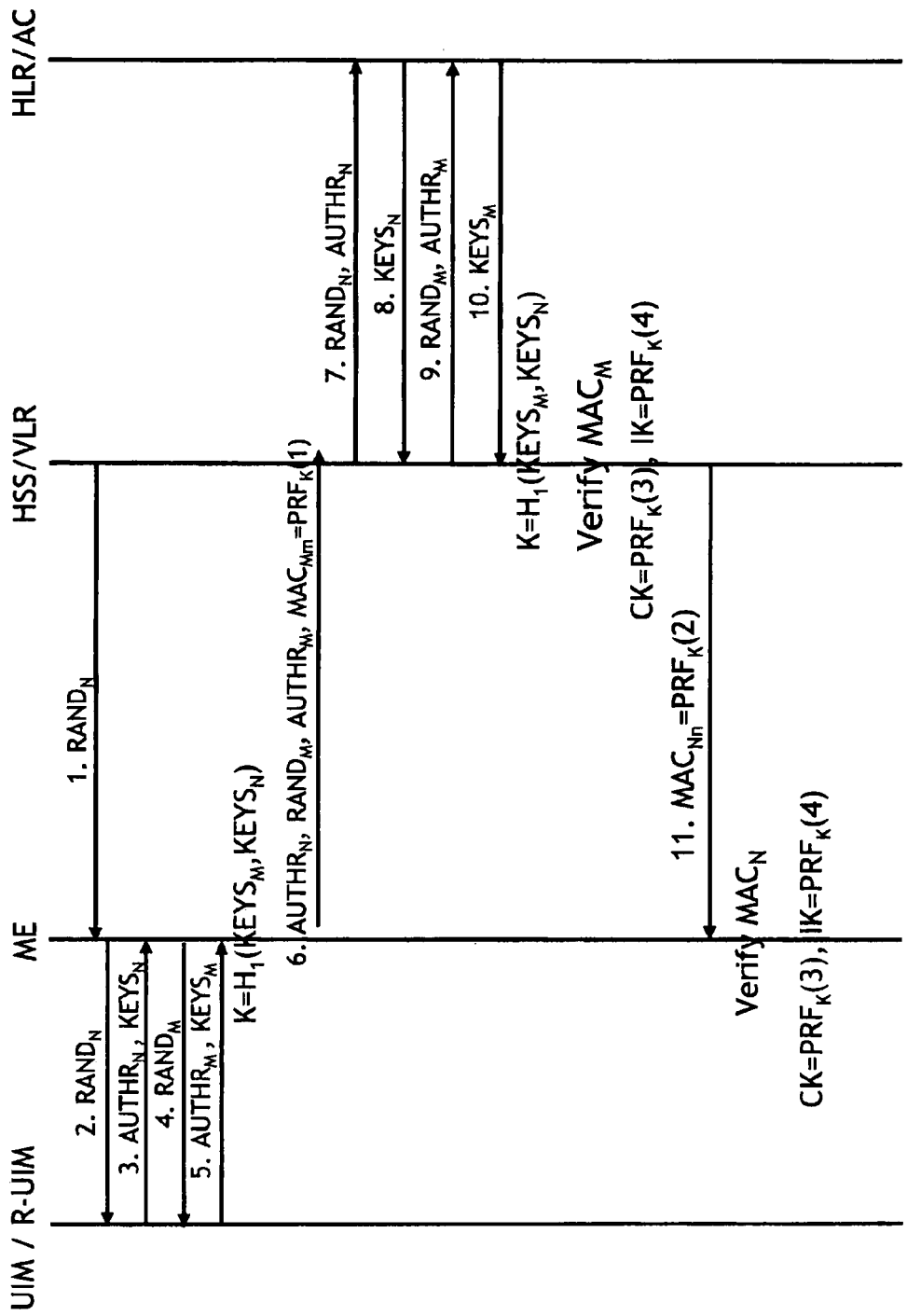
FIG. 3 illustrates a signal flow diagram illustrating communication between the ME of the mobile equipment, the UIM of the mobile equipment, a home serving system/visitor location register (HSS/VLR) of the network, and the HLR/AC of the network according to an example embodiment.

FIG. 3 is a signal flow diagram illustrating communications between the ME of the mobile equipment 100, the UIM of the mobile equipment 100, a home serving system/visitor location register (HSS/VLR) of the network 20, and the HLR/AC of the network 20.

Referring to FIG. 3, the HSS/VLR provides a first challenge, which is generated by HSS/VLR to the ME. The first challenge is a first random number $RAND_N$, which was generated by the HSS/VLR, to the ME. For example, the transceiver 140 of the ME receives the random number first $RAND_N$ and may store the first random number $RAND_N$ in the memory 120 and/or provide the first random number $RAND_N$ to the processor 130. The ME provides the random number $RAND_N$ to the UIM. In response to receiving the random number $RAND_N$, the UIM calculates a network authentication response $AUTHR_N$ and network keys $KEYS_N$ based on the random number $RAND_N$. In particular, the UIM calculates the network authorization response $AUTHR_N$ using the random number $RAND_N$ and a value of a secret key, which is stored in the UIM. The network keys $KEYS_N$ calculated by the UIM may include a PLCM and SMEKEY, for example. Calculating the network authorization response $AUTHR_N$ and network keys $KEYS_N$ from a random number $RAND_N$ is well known in the art and thus, will not be discussed further herein for the sake of brevity.

Still referring to FIG. 3, the ME then generates a second random number $RAND_M$ and provides the second random number $RAND_M$ as a challenge to the UIM. For example, the processor 130 of the ME generates the second random number by any well-known method and provides the second random number $RAND_M$ to the UIM.

The UIM then generates a mobile authentication response $AUTHR_M$ and mobile keys $KEYS_M$ based on this second random number. As previously mentioned, calculating an authentication response and keys such as the PLCM and SMEKEY from a random number are well-known in the art.

According to an example embodiment, the ME then generates an authentication key $K_M$ based on both the network keys $KEYS_N$ and mobile keys $KEYS_M$, which are generated by the UIM. For example, the authentication key $K_M$ may be a hash of the mobile $KEYS_M$ and network $KEYS_N$ as shown by the following equation, which is also shown in FIG. 3.

$$K_M = H_1(KEYS_M, KEYS_N)$$

Following the operations illustrated by signals 1-5 of FIG. 3, the ME has an authentication key $K_M$ which includes keys associated with both the mobile equipment 100 and the network 20 including the HSS/VLR and the HLR/AC.

Still referring to FIG. 3, the ME then provides the network authentication response $AUTHR_N$, the second random number $RAND_M$, and the mobile authentication response $AUTHR_M$ to the HSS/VLR of the network 20. In addition to the network authentication response $AUTHR_N$, the random $RAND_M$ and the mobile authentication response $AUTHR_M$, the ME may send a mobile message authentication code $MAC_{Mm}$ to the HSS/VLR. If this is the case, the ME first generates the mobile message authentication code $MAC_{Mm}$ based on the authentication key $K_M$. For example, the mobile message authentication code $MAC_{Mm}$ may be a pseudo random function calculated using the authentication key $K_M$ and the random number $RAND_M$, which was generated by the ME. The generation of a message authentication code is well known in the art and thus, will not be discussed further in here for the sake of brevity.

In FIG. 3, once the HSS/VLR receives the network authentication response $AUTHR_N$ from the ME, the HSS/VLR provides the first random number $RAND_N$, which was previously generated by the HSS/VLR and the network authentication response $AUTHR_N$ received from the ME to the HLR/AC. The HLR/AC calculates network keys $KEYS_N$ based on the first random number $RAND_N$ and the network authorization response $AUTHR_N$ and provides the calculated network $KEYS_N$ to the HSS/VLR.

As shown in FIG. 3, the HSS/VLR also provides the received second random number $RAND_M$ and authorization response $AUTHR_M$ received from the ME to the HLR/AC, thereby requesting keys associated with the ME be generated by the HLR/AC. Accordingly, the HLR/AC calculates the mobile keys $KEYS_M$ from the random number $RAND_M$ and mobile authorization response $AUTHR_M$, and provides the mobile keys $KEYS_M$ back to the HSS/VLR.

The HSS/VLR then generates an example embodiment of an authentication key $K_N$ based on the mobile keys $KEYS_M$ and network keys $KEYS_N$ received from the HLR/AC. The authentication key $K_N$ is calculated in the same manner as the authentication key $K_M$ was calculated at the ME, except that the authentication key $K_N$ is calculated based on the network keys $KEYS_N$ and mobile keys $KEYS_M$, which were provided by the HLR/AC, instead of the mobile $KEYS_M$ and network $KEYS_N$ calculated by the UIM.

According to the example embodiment shown in FIG. 3, the authentication key $K_M$ generated by the ME includes at least a portion of the mobile $KEYS_M$ calculated from a random number $RAND_M$ generated by the mobile equipment 100. As such, an attacker cannot merely use a past session key such as an SMEKEY and PLCM and replay a random number to complete the key agreement protocol. Similarly, the authentication key $K_N$ generated by the network 20 is based on at least a portion of network keys $KEYS_N$ generated based on the first random number $RAND_N$ generated by the network and thus, an attacker cannot merely use a compromised past session key and replay a random number to complete the key agreement protocol.

Still referring to FIG. 3, the HSS/VLR may verify the ME by comparing a mobile message authentication code $MAC_{Mm}$ received from the ME with a mobile message authentication code $MAC_{Mn}$ generated by the HSS/VLR. The mobile message authentication code $MAC_{Mn}$ is generated using the authentication key $K_N$. For example, the mobile message authentication code $MAC_{Mn}$ is a pseudo random function calculated using the authentication key $K_N$. If the mobile message authentication code $MAC_{Nme}$ received from the ME matches the mobile message authentication code $MAC_{Mn}$ generated by the HSS/VLR, the HSS/VLR determines the ME is authentic. The HSS/VLR may then calculate a network message authentication code $MAC_{Nn}$ and provide the network message authentication code $MAC_{Nn}$ to the ME as illustrated by signal 11 of FIG. 3.

In response to receiving the network message authentication code $MAC_{Nn}$ from the HSS/VLR, the ME may authenticate the HSS/VLR. For example, the ME may generate its own network message authentication code $MAC_{Nm}$ based on authentication key $K_M$ and compare this generated network message authentication code $MAC_{Nm}$ with network message authentication code $MAC_{Nn}$ received from the HSS/VLR. The ME determines the HSS/VLR is authentic if the network message authentication code $MAC_{Nm}$ generated by the mobile matches the network message authentication code $MAC_{Mn}$ received from the HSS/VLR.

FIG. 3 also illustrates that a cryptographic key CK and an integrity key IK may be generated by the HSS/VLR if the HSS/VLR determines the ME is authentic, and a cryptographic key CK and a integrity key IK may be generated by the ME if the ME determines the HSS/VLR 400 is authentic. The generation of a cryptographic key CK and an integrity key IK is well known in the art and thus, will not discussed herein for the sake of brevity. Further, the use of a cryptographic key CK and an integrity key IK in communications between a mobile equipment 100 and an HSS/VLR is well known in the art, and thus will be omitted herein for the sake of brevity.

Figure 4:
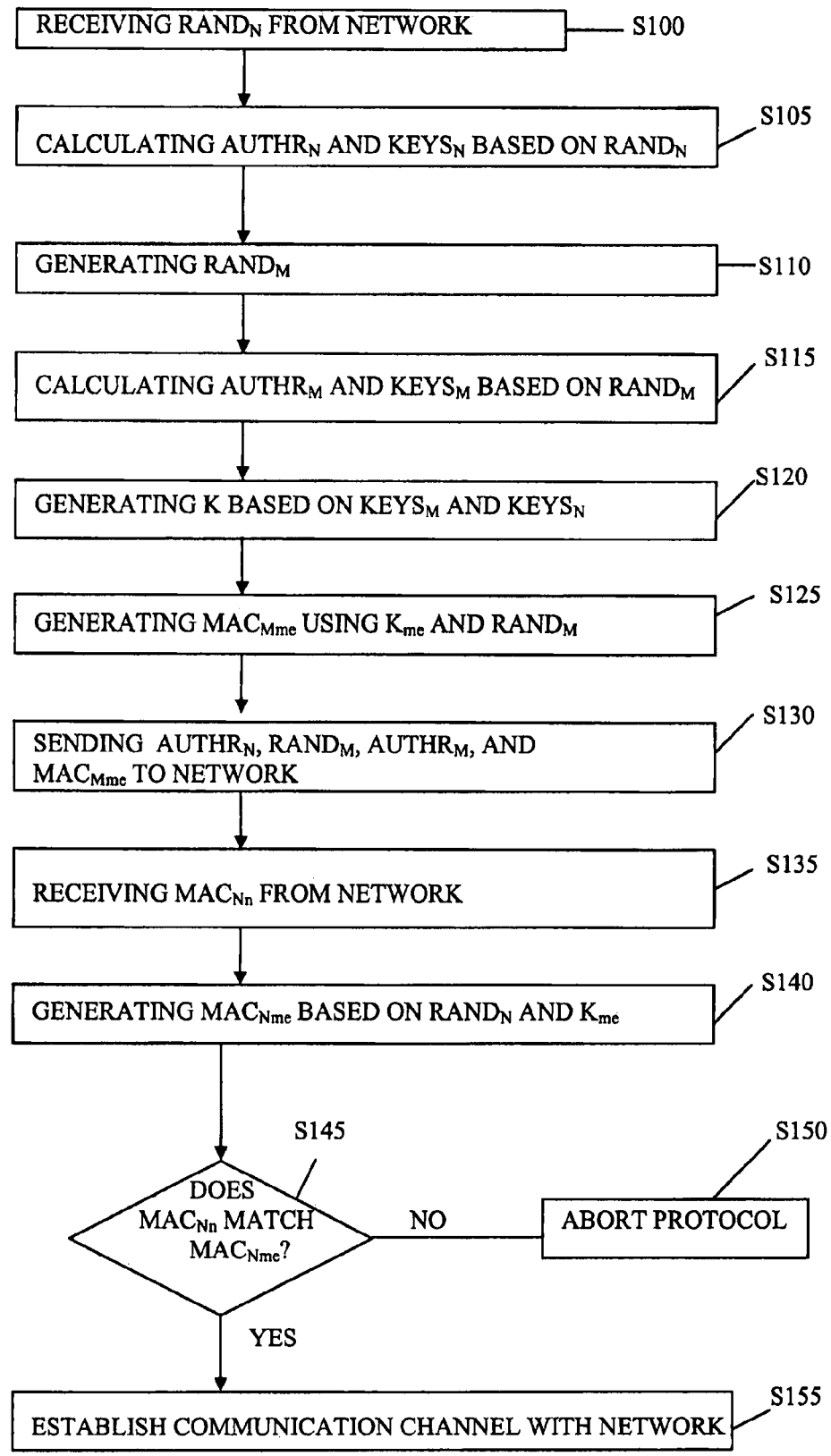
FIG. 4 is a flow chart illustrating an example embodiment of a method performed by the mobile equipment to generate an authentication key.

The flow chart shown in FIG. 4 illustrates an example embodiment of a method performed by the mobile equipment 100 to generate an authentication key $K_M$.

In step S100, the transceiver 140 of the ME receives a first random number $RAND_N$ from the network 20. In response to receiving the first random number $RAND_N$, the transceiver 140 may store the first random number $RAND_N$ in the memory 120 and/or provide the first random number $RAND_N$ to the processor 130. As such, the UIM may obtain the first random number $RAND_N$ from the memory 120 and/or receive the first random number $RAND_N$ from the processor 130. In step S105, the UIM calculates a network authentication response $AUTHR_N$ and network keys $KEYS_N$ based on the first random number $RAND_N$. As previously mentioned, these calculations are well known in the art.

In step S110 of FIG. 4, the ME generates a second random number $RAND_M$. For example, the processor 130 generates a second random number $RAND_M$ and provides the random number $RAND_M$ to the UIM.

The UIM then calculates a mobile authentication response $AUTHR_M$ and mobile keys $KEYS_M$ based on the random number $RAND_M$ in step S115. As such, the ME obtains network keys $KEYS_N$ based on the random number $RAND_N$ received from the network and mobile keys $KEYS_M$ based on the random number $RAND_M$ generated by the ME according to an example embodiment.

In step S120, the ME generates an example embodiment of an authentication key $K_M$ based on the mobile keys $KEYS_M$ and the network keys $KEYS_N$. For example, the processor 130 of the ME may generate the authentication $K_M$, and the authentication key $K_M$ is a hash including at least a portion of the mobile keys $KEYS_M$ and the network keys $KEYS_N$.

Steps S100-S120 described above illustrate an example embodiment of a method performed by the mobile equipment 100 to generate the authentication key $K_M$.

Steps S125-155 of FIG. 4 described below are steps the mobile equipment 100 may perform following the generation of the authentication key $K_M$ to establish a mutually authenticated communication channel with the network 20. In step S125, the ME generates a mobile message authentication code $MAC_{Mme}$ using the authentication key $K_M$ and the random number $RAND_M$ generated by the ME. Step S125 may be performed by the processor 130 of the ME. As shown in step S130, the transceiver 140 of the ME may then send the network authorization response $AUTHR_N$, the random number $RAND_N$, the mobile authorization response $AUTHR_M$, and the mobile message authentication code $MAC_{Mm}$ to the HSS/VLR of the network 20.

In step S135, the transceiver 140 of the ME receives a network message authentication code $MAC_{Nn}$ from the network 20. In step S140, the ME generates a network message authentication code $MAC_{Nm}$ based on the random number $RAND_N$ received from the network in step S100 and the authentication key $K_M$ generated in step S120. In step S145, the ME compares the network message authentication code $MAC_{Nn}$ received from the network with the network message authentication code $MAC_{Nm}$ generated by the ME.

If the two network message authentication codes do not match, the ME may abort the method the security protocol as shown in step S150. For example, the ME may send a failure notice to the network or just silently abandon the rest of the protocol. Alternatively, if the two network message authentication codes do match, a mutually authenticated communication channel is established between the ME and the network 20 in step S150.

Figure 5:
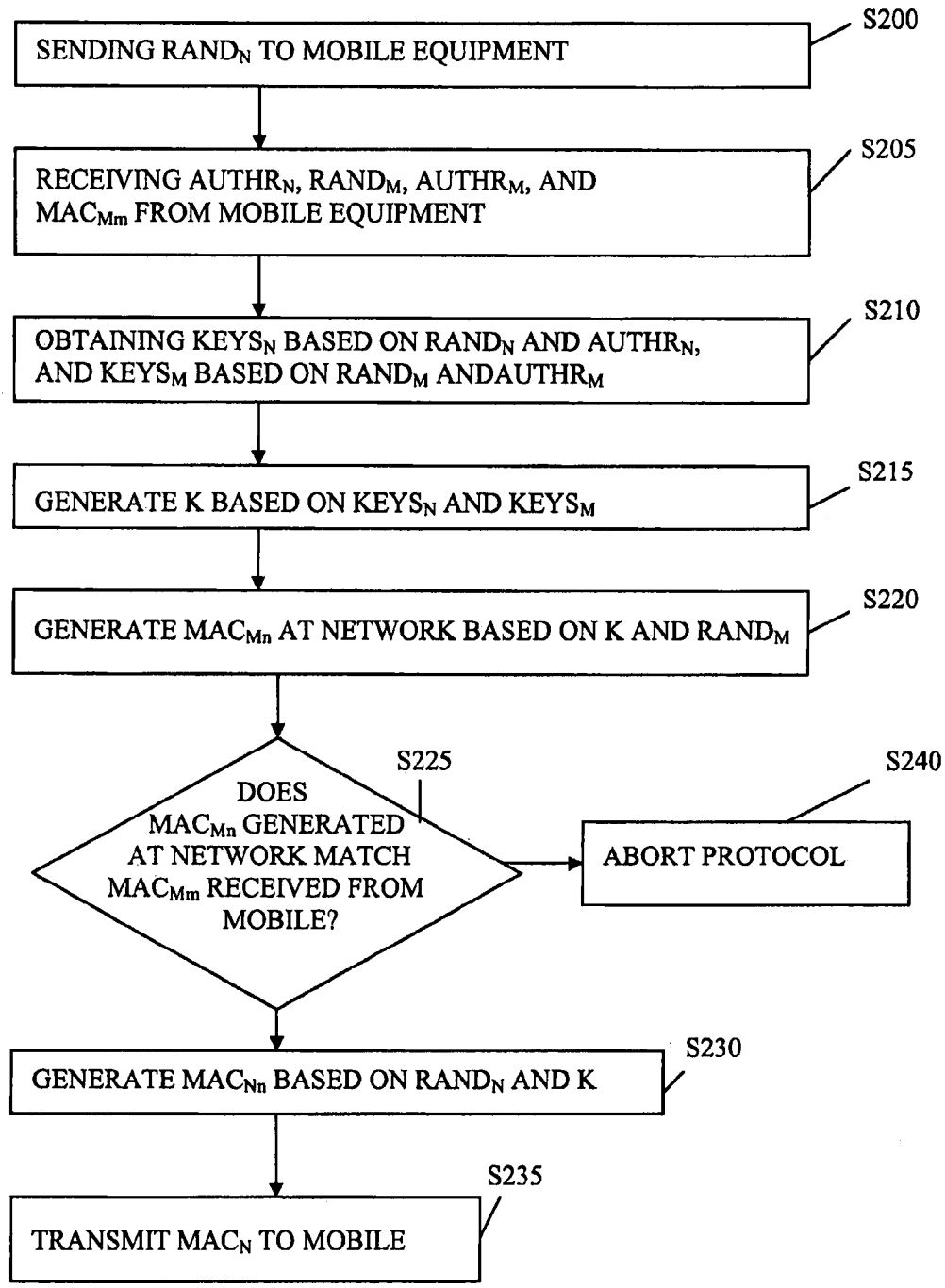
FIG. 5 is a flow chart illustrating an example embodiment of a method performed by the network to generate an authentication key.
Figure 6:
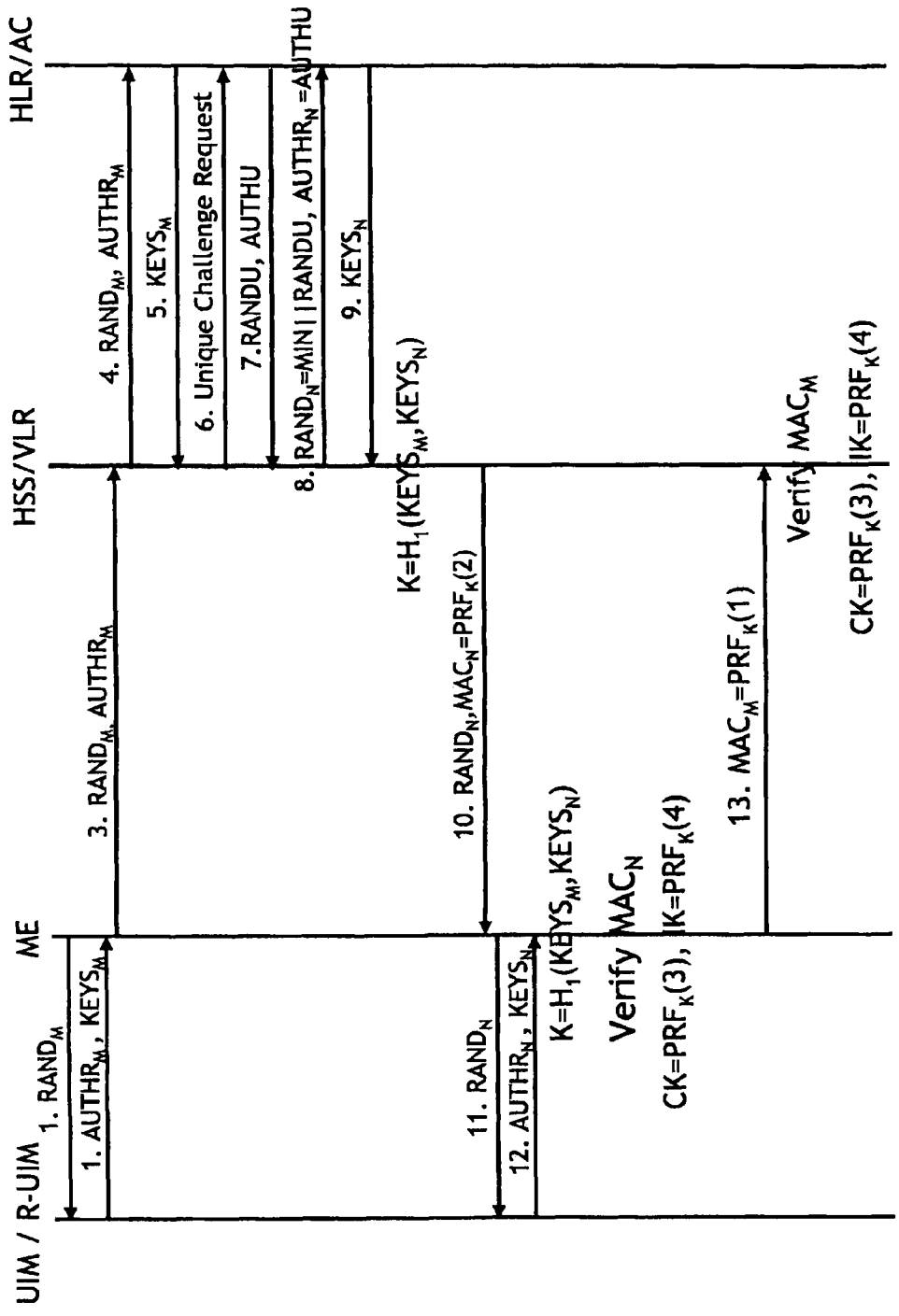
FIG. 6 illustrates a signal flow diagram illustrating communication between the ME, the UIM, the HSS/VLR, and the HLR/AC according to another example embodiment.

The flow chart shown in FIG. 5 illustrates an example embodiment of a method performed by the network 20 to generate an authentication key $K_N$.

In step S200, the network 20 generates a first random number $RAND_N$ and sends the first random number $RAND_N$ to the mobile equipment 100. For example, the HSS/VLR may generate and send the first random number $RAND_N$ to the transceiver 140 of the ME.

In step S205, the network 20 receives a network authorization response $AUTHR_N$, a second random number $RAND_M$, and a mobile authorization response $AUTHR_M$ from the ME. In step S205, the network 20 is also shown to receive a mobile message authentication code $MAC_{Mm}$ generated by the ME, however, it is noted that this mobile message authentication code $MAC_{Mm}$ may be received at a later time.

In response to receiving the network authorization response $AUTHR_N$, the random number $RAND_M$ and the mobile authorization response $AUTHR_M$ from the ME, the network 20 obtains network $KEYS_N$ based on the first random number $RAND_N$ and the network authorization response $AUTHR_N$, and obtains mobile $KEYS_M$ based on the second random number $RAND_M$ and the mobile authorization response $AUTHR_M$. For example, as illustrated in the signal flow diagram of FIG. 3, the HSS/VLR provides the first random number $RAND_N$ and the network authorization response $AUTHR_N$ to the HLR/AC and in return, the HLR/AC calculates and provides the network keys $KEYS_N$ back to the HSS/VLR. In addition, the HSS/VLR provides the random number $RAND_M$ and the mobile authorization response $AUTHR_M$ to the HLR/AC and in return, the HLR/AC calculates the mobile keys $KEYS_M$ and provides the mobile keys $KEYS_M$ back to HSS/VLR. As previously mentioned, both the network keys $KEYS_N$ and the mobile keys $KEYS_M$ may include PLCM and SMEKEY associated with the network 20 and mobile equipment 100, respectively.

In step S215, the network 20 generates an example embodiment of an authentication key $K_N$ based on the network keys $KEYS_N$ and the mobile keys $KEYS_M$ generated by the network.

Step S200-S215 described above illustrate an example embodiment of a method performed by the mobile equipment 100 to generate the authentication key $K_N$. Steps S220-S235 described below are steps the network 20 may perform following the generation of the authentication key $K_N$ to establish a mutually authenticated communication channel with the mobile equipment 100.

In step S220, the network 20 generates a mobile message authentication code $MAC_{Mn}$ based on the authentication key $K_N$ and the random number $RAND_M$. In step S225, the network 20 compares the mobile message authentication code $MAC_{Mn}$ generated by the network 20 with the mobile message authentication code $MAC_{Mm}$ received from the ME in step S205, for example. The HLS/VLR of the network 20 determines the ME is authentic if the mobile message authentication code $MAC_{Mn}$ generated at the network matches the mobile message authentication code $MAC_{Mm}$ received from the ME.

If in step S225 the HLS/VLR of the network 20 determines the mobile message authentication code $MAC_{Mn}$ generated by the network 20 matches the mobile message authentication code $MAC_{Mm}$ received from the mobile equipment 100, the network 20 may generate a network message authentication code $MAC_{Nn}$ based on the random number $RAND_N$ and the authentication key $K_N$. In step S235, the network 20 transmits the network authentication code $MAC_{Nn}$ to the mobile equipment 100 in attempt to establish a mutually authenticated communication channel between the mobile equipment 100 and the network 20. Alternatively, if the network 20 determines the mobile message authentication code $MAC_{Mn}$ generated at the network 20 does not match the mobile message authentication code $MAC_{Mm}$ received from the ME, the method illustrated in FIG. 5 is aborted by the network 20 in step S240.

FIG. 6 is a signal flow diagram illustrating communications between ME, a UIM, a HSS/VLR, and HLR/AC according to another example embodiment. In this signal flow diagram the ME initiates the communication between the mobile equipment 100 and the network 20.

Referring to FIG. 6, the ME generates a first challenge, which is a first random number $RAND_M$, and provides the first challenge to the UIM. In response, the UIM calculates the mobile authorization response $AUTHR_M$ and mobile keys $KEYS_M$ based on the first random number $RAND_M$ and provides the mobile authorization response $AUTHR_M$ and mobile $KEYS_M$ back to the ME. The ME then provides the first random number $RAND_M$ and the mobile authorization response $AUTHR_M$ to the network 20. As shown in FIG. 6, the first random number $RAND_M$ and the mobile authorization response $AUTHR_M$ is provided to the HSS/VLR of the network 20.

The HSS/VLR provides the received first random number $RAND_M$ and the received mobile authorization response $AUTHR_M$ to the HLR/AC of the network 20. The HLR/AC calculates the mobile keys $KEYS_M$ based on the first random number $RAND_M$ and the network authentication response $AUTHR_M$ and provides the calculated mobile keys $KEYS_M$ to the HSS/VLR. Further, the HSS/VLR generates and sends a unique challenge request to the HLR/AC. In response to the unique challenge request, the HLR/AC generates a unique random number $RAND_U$ and a unique authorization response $AUTHR_U$, which is provided to the HSS/VLR. The HSS/VLR uses the unique random number $RAND_U$ and the unique authorization response $AUTHR_U$ to calculate a second random number $RAND_N$ and a network authorization response $AUTHR_N$, which is provided to the HLR/AC. For example, the second random number $RAND_N$ may be concatenation of a mobile identification number MIN and the unique random number $RAND_U$, and the network authorization $AUTHR_N$ may be the unique authorization response $AUTHR_U$ as indicated in FIG. 6. The HLR/AC then calculates network keys $KEYS_N$ based on the second random number $RAND_N$ and the network authorization response $AUTHR_N$. The HLR/AC provides the network keys $KEYS_N$ to the HSS/VLR.

The HSS/VLR then generates an example embodiment of an authentication key $K_N$ based on the mobile keys $KEYS_M$ and the network keys $KEYS_N$, which were generated by the HLR/AC.

Still referring to FIG. 6, the HSS/VLR sends the second random number $RAND_N$, which was generated by the HSS/VLR as a second challenge to the ME. Further, the HSS/VLR may also send a network message authentication code $MAC_{Nn}$ to the ME along with the second random number $RAND_N$. However, one skilled in the art will appreciate that the network message authentication code $MAC_{Nn}$ may be sent in a later step. In response to receiving the second random number $RAND_N$ from the network, the ME provides the second random number $RAND_N$ to the UIM. The UIM then calculates a network authorization $AUTHR_N$ and network keys $KEYS_N$ from the second random number $RAND_N$.

The ME then calculates an example embodiment of an authentication key $K_M$ based on the mobile keys $KEYS_M$ and the network keys $KEYS_N$, which are each calculated by the UIM. For example, the authentication key $K_M$ may be a hash including at least a portion of the mobile keys $KEYS_M$ and the network keys $KEYS_N$. As such, according to an example embodiment, the mobile equipment 100 generates an authentication key $K_M$ based on mobile keys $KEYS_M$ and network keys $KEYS_N$ which are generated by the UIM, and the network 20 generates an authentication key $K_N$ from mobile keys $KEYS_M$ and network keys $KEYS_N$ that are calculated in the network 20.

According to the example embodiment shown in FIG. 6, the authentication key $K_M$ generated by the mobile equipment 100 includes at least a portion of the mobile $KEYS_M$ calculated from a random number $RAND_M$ generated by the mobile equipment 100. As such, an attacker cannot merely use a past session key such as an SMEKEY and PLCM and replay a random number to complete the key agreement protocol. Similarly, the authentication key $K_N$ generated by the network 20 based on at least a portion of network keys $KEYS_N$ generated based on the first random number $RAND_N$ generated by the network and thus, an attacker cannot merely use a comprised past session key and replay a random number to complete the key agreement protocol.

Still referring to FIG. 6, if the network 20 has already provided the network message authentication code $MAC_{Nn}$ to the mobile equipment 100 as shown by signal 10 in FIG. 6, the ME may then verify the network message authentication code $MAC_{Mn}$. In particular, the ME may generate its own network message authentication code $MAC_{Nm}$ and compare this network message authentication code $MAC_{Nm}$ with the network message authentication code $MAC_{Nn}$ received from the HSS/VLR of the network 20. If the network message authentication code $MAC_{Nm}$ generated by the ME matches the network message authentication code $MAC_{Nn}$ received from the HSS/VLR, the ME determines the HSS/VLR is authentic.

If the HSS/VLR of the network 20 is determined to be authentic, the ME generates a mobile message authentication code $MAC_{Mm}$ and provides the mobile message authentication code $MAC_{Mm}$ to the HSS/VLR. The HSS/VLR then attempts to verify the mobile equipment 100 based on the received mobile message authentication code $MAC_{Mm}$. As such, the HSS/VLR generates its own mobile message authentication code $MAC_{Mn}$ and compares this generated mobile message authentication code $MAC_{Mn}$ with the mobile message authentication code $MAC_{Mm}$ received from the ME. If the received mobile message authentication code $MAC_{Mm}$ matches the generated mobile message authentication code $MAC_{Mn}$, the HSS/VLR determines the ME is authentic and attempts to establish a mutually authenticated communication channel with the ME.

FIG. 6, like FIG. 3, illustrates that a cryptographic key CK and an integrity key IK may be generated by the HSS/VLR if the HSS/VLR determines the ME is authentic, and a cryptographic key CK and a integrity key IK may be generated by the ME if the ME determines the HSS/VLR is authentic. The generation of a cryptographic key CK and an integrity key IK is well known, and the use of a cryptographic key CK and an integrity key IK in communications between a ME and an HSS/VLR is well known.

Figure 7:
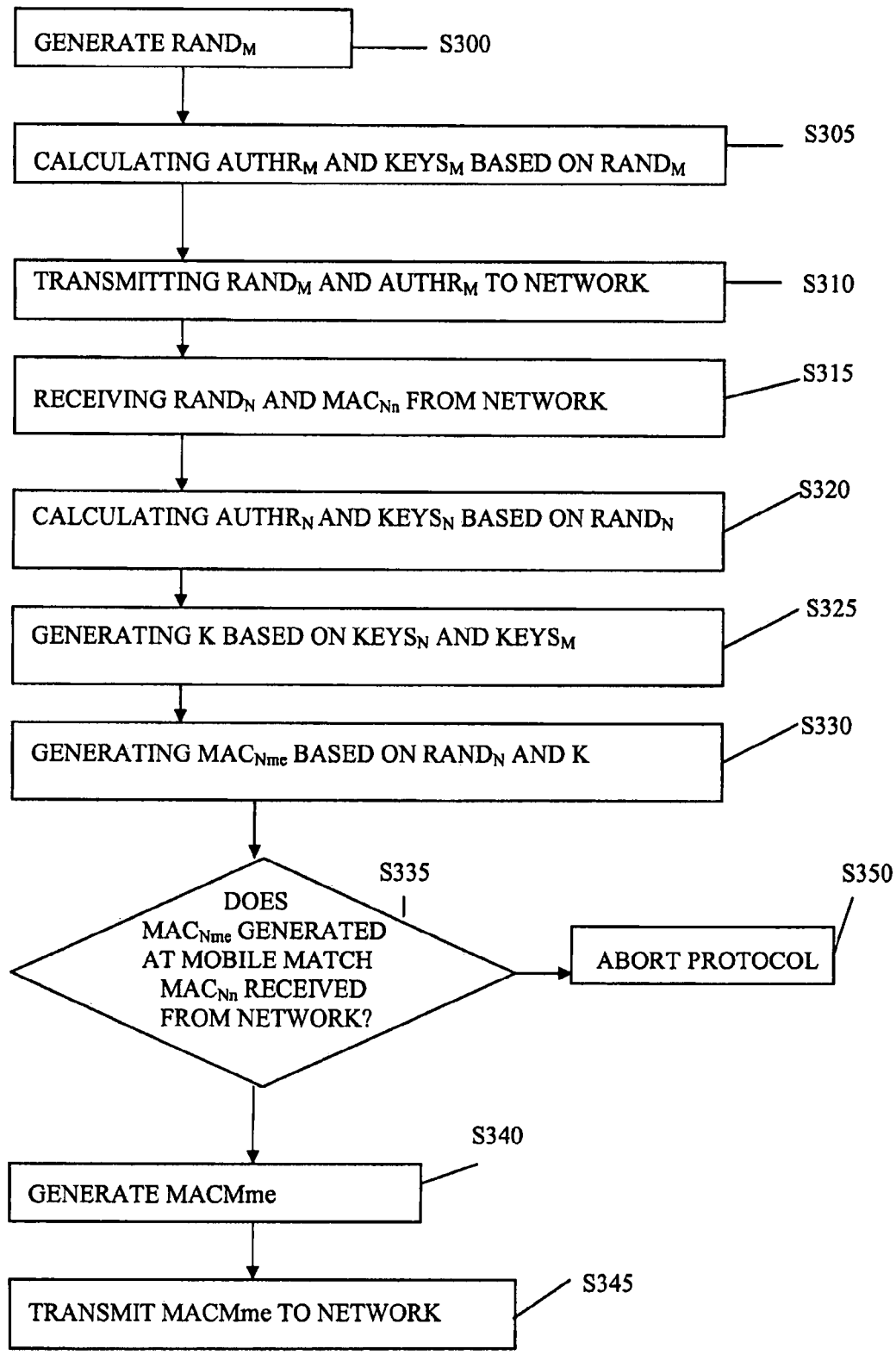
FIG. 7 is a flow chart illustrating another example embodiment of a method performed by the mobile equipment to generate an authentication key.

The flow chart shown in FIG. 7 illustrates another example embodiment of a method performed by the mobile equipment 100 to generate authentication key $K_M$.

In step S300, the mobile equipment 100 generates a first random number $RAND_M$. In particular, the processor 130 of the ME generates a random number $RAND_M$ as is well known in the art. The processor 130 of the ME provides the generated random number $RAND_M$ to the UIM. Based on the random number $RAND_M$, the UIM calculates a mobile authorization response $AUTHR_M$ and mobile keys $KEYS_M$ in step S305. For example, the mobile keys $KEYS_M$ are a PLCM and SMEKEY.

The ME then transmits the random number $RAND_M$ and the mobile authorization response $AUTHR_M$ to the network 20 in step S310. For example, the transceiver 140 of the ME provides the random number $RAND_M$ and the mobile authorization response $AUTHR_M$ to the HSS/VLR of the network 20.

In step S315, the ME receives a second random number $RAND_N$ and a network message authentication code $MAC_N$ from the network 20. In step S320, the ME calculates the network authorization response $AUTHR_N$ and network keys $KEYS_N$ based on the received second random number $RAND_N$. For example, the processor 140 of the ME provides the received second random number $RAND_N$ to the UIM, and the UIM calculates the network authorization response $AUTHR_N$ and the network keys $KEYS_N$. The UIM provides the network authorization response $AUTHR_N$ and the network keys $KEYS_N$ to the processor 130 and/or the memory 120 of the ME.

Based on the network keys $KEYS_N$ and mobile keys $KEYS_M$, which are generated by the UIM according to an example embodiment, the ME generates an authentication key $K_M$. In particular, the processor 130 of the ME may generate the authentication key $K_M$ by calculating a hash including at least a portion of the network keys $KEYS_N$ and mobile keys $KEYS_M$.

After the performance of steps S300 to S325, the mobile equipment 100 possesses an example embodiment of the authentication key $K_M$. The mobile equipment 100 may then continue the method illustrated in FIG. 7 in an attempt to establish a mutually authentication communication channel with the network 20.

In step S330, the mobile equipment 10 generates a network message authentication code $MAC_{Nm}$ based on the random number $RAND_N$ received from network 20 using the example embodiment of the authentication key $K_M$.

In step S335, the ME compares the network message authentication code $MAC_{Nm}$ generated by the ME with the network message authentication code $MAC_{Nn}$ received from the network 20 to determine if the two network message authentication codes match. If the two network message authentication codes do not match, the ME may abort the security protocol as shown in step S350. For example, the ME may send a failure notice to the network or just silently abandon the rest of the protocol.

Alternatively, if the network message authentication code $MAC_{Nm}$ generated by the ME of the mobile equipment 100 does match the network message authentication code $MAC_{Nn}$ received from the network 20, the method shown in FIG. 7 proceeds to step S340.

In step S340, the ME generates a mobile message authentication code $MAC_{Mm}$. In step S345, the ME transmits the generated mobile message authentication code $MAC_{Mm}$ to the network 20 in an attempt to establish a mutually authenticated communication channel with the network 20 which was verified as discussed above in step S335.

Figure 8:
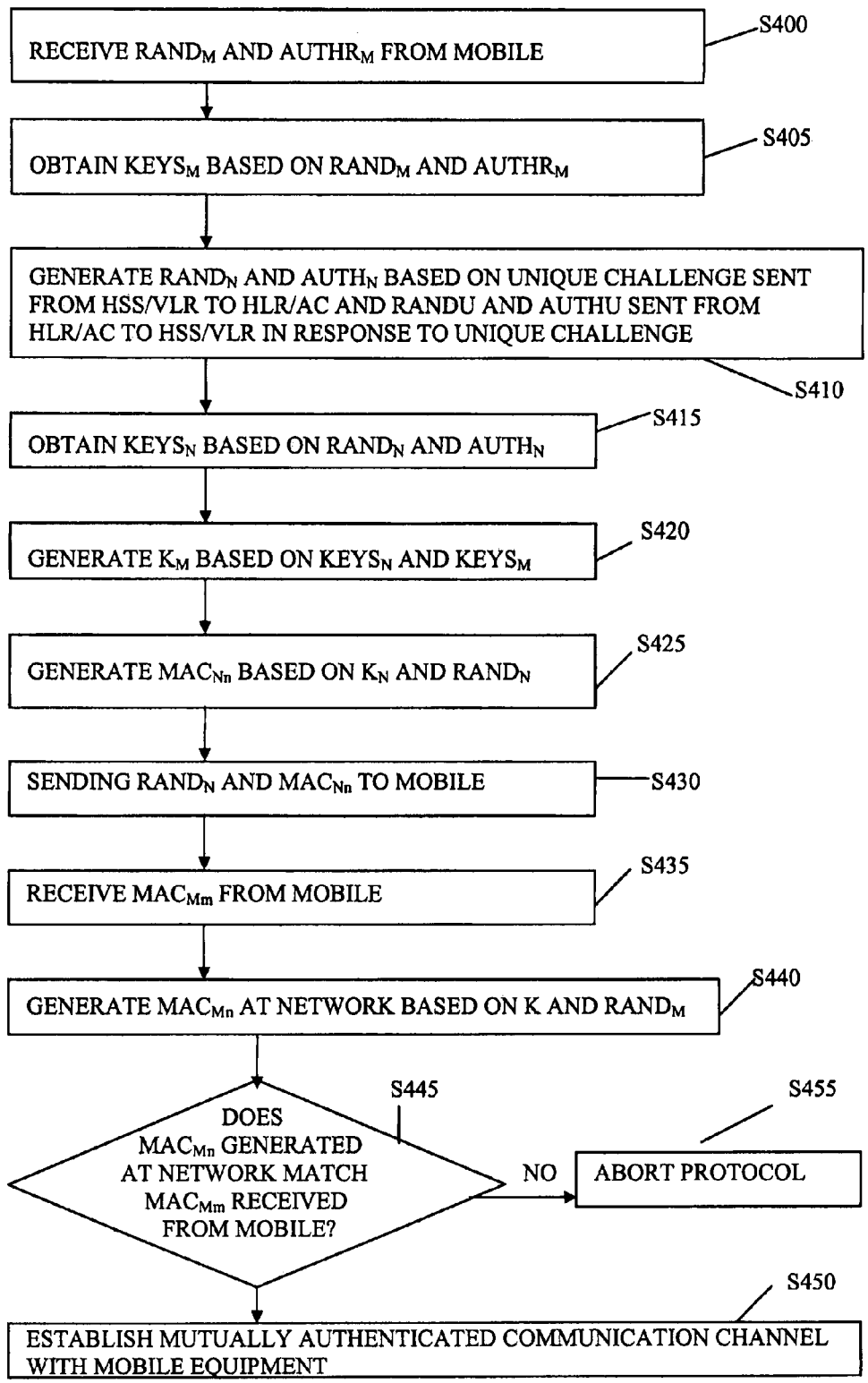
FIG. 8 is a flow chart illustrating another example embodiment of a method performed by the network to generate an authentication key.

The flow chart shown in FIG. 8 illustrates another example embodiment of a method performed by the network 20 to generate an authentication key $K_N$.

In step S400, the network 20 receives a random number $RAND_M$ and a mobile authorization response $AUTHR_M$ from mobile equipment 100. For example, the random number $RAND_M$ and the mobile authorization response $AUTHR_M$ may be received by the HSS/VLR 400 of the network 20.

In step S405, the network 20 obtains mobile keys $KEYS_M$ based on the received random number $RAND_M$ and mobile authorization response $AUTHR_M$. For example, the HSS/VLR of the network 20 provides the random number $RAND_M$ and the mobile authorization response $AUTHR_M$ received from the mobile equipment 100 to the HLR/AC of the network 20, and the HLR/AC calculates the mobile keys $KEYS_M$ based on the random number $RAND_M$ and the mobile authorization response $AUTHR_M$.

In step S410, the network 20 generates a second random number $RAND_N$ and a network authorization response $AUTHR_N$. In particular, as illustrated by signals 6-9 of FIG. 6, the HSS/VLR generates a unique challenge request and provides this unique challenge request to the HLR/AC. In response to receiving the unique challenge request, the HLR/AC generates a unique random number $RAND_U$ and unique authorization response $AUTHR_U$ and provides this information to the HSS/VLR. The HSS/VLR then generates a random number $RAND_N$ and a network authorization response $AUTHR_N$ from the unique random number $RAND_U$ and unique authorization response $AUTHR_U$ and provides the random number $RAND_N$ and the network authorization response $AUTHR_N$ to the HLR/AC.

In step S415, the network 20 obtains network keys $KEYS_N$ based on the random number $RAND_N$ and the network authorization response $AUTHR_N$. In particular, the HLR/AC calculates the network keys $KEYS_N$ based on the random number $RAND_N$ and the $AUTHR_N$ received from the HSS/VLR and provides the calculated network keys $KEYS_N$ to the HSS/VLR.

In step S420, the network 20 generates an example embodiment of an authentication key $K_N$ based on the network keys $KEYS_N$ and the mobile keys $KEYS_M$ generated by the network 20. For example, the example embodiment of the authentication key $K_N$ is a hash including at least a portion of the mobile keys $KEYS_M$ and in network keys $KEYS_N$.

As a result of the performance of steps S400 to S425, the network 20 possesses an example embodiment of the authentication key $K_N$. The network 20 may then continue the method illustrated in FIG. 8 in an attempt to establish a mutually authentication communication channel with the mobile equipment 100.

In step S425, the network 20 generates a network message authentication code $MAC_{Nn}$ based on the authentication key $K_N$ and the random number $RAND_N$. For example, the HSS/VLR may perform this operation on behalf of the network 20.

The HSS/VLR of the network 20 then sends the random number $RAND_N$ and network authentication code $MAC_{Nn}$, which are both generated by the network 20 to the mobile equipment 100 in step S430. In response, the HSS/VLR of the network 20 may receive a mobile message authentication code $MAC_{Mm}$ from the mobile equipment 100 in step S435. In step S440, the network 20 generates its own mobile message authentication code $MAC_{Mn}$ based on the authentication key $K_N$ and the random number $RAND_M$ previously received from the mobile equipment 100 as described in step S400.

In step S445, the network 20 attempts to verify the authenticity of the mobile equipment 100 by comparing the mobile message authentication code $MAC_{Mn}$ generated at the network 20 with the mobile message authentication code $MAC_{Mm}$ received from the mobile equipment 100.

If the mobile message authentication code $MAC_{Mn}$ generated at the network 20 does not match the mobile message authentication code $MAC_{Mm}$ received from the mobile equipment 100, the network 20 may abort the security protocol as shown in step S455.

Alternatively, if the mobile message authentication code $MAC_{Mn}$ generated at the network 20 does match the mobile message authentication code $MAC_{Mm}$ received from the mobile equipment 10, the network 20 determines the mobile equipment 100 is authentic and attempts to establish a mutually authenticated communication channel with the mobile equipment 10 as shown in step S450.

According to another example embodiment, a RAND/AUTHR value created in a first protocol run by the mobile equipment is used in a future protocol run. Since the network cannot create a RAND/AUTHR pair, the network requests the ME to create a RAND/AUTHR pair during the first protocol run, and in a subsequent second protocol run, the network requests that the ME use the RAND/AUTHR created in the first protocol run to create a SMEKEY/PLCM used to generate an authentication key. According to this example embodiment, the number of communications between the network and mobile equipment may be reduced while still providing a mutually authenticated communication channel.

The example embodiments described above enable the establishment of a mutually authenticated communication channel with use of the IS-41 authentication procedures. However, it is noted that typically, 64-bit random challenges are used with 64-bit keys to provide sufficient security. However, security would be further improved if larger random challenges, i.e., larger random numbers can be used. Accordingly, the example embodiment described below may be used to increase the number of bits available for the random numbers used in the previously described example embodiments.

As is well known in the art, the call type of a communication may be defined as a call registration, a call origination, or a call termination. Conventionally, for a call origination calculation, the six last call digits are used instead of a 24-bit IMSI in the CAVE calculations performed by the UIM. Six digits can be encoded in approximately 20 bits. The example embodiments described below with respect to FIGS. 9 and 10 exploit the difference between the calculations relating to a call origination type and the call registration type or call termination type.

Figure 9:
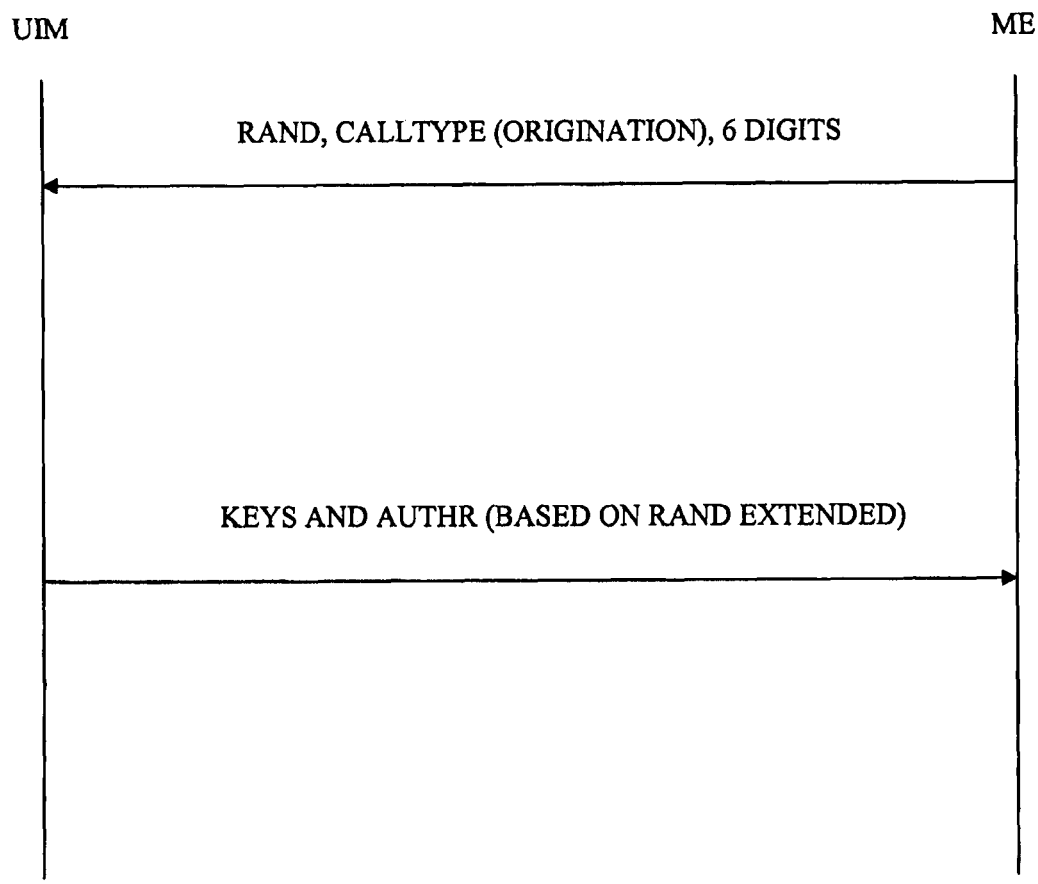
FIG. 9 is a signal flow diagram illustrating yet another example embodiment of method performed by the mobile equipment including the UIM.

FIG. 9 illustrates an example embodiment of method performed by the mobile equipment 100 including the UIM. As shown in FIG. 9, the ME sends a communication including a random number, a call type indicator indicating a call origination, and six digits, which can be encoded in about 20 bits, to the UIM. Because the call type is designated as a call origination, bits used for the six digits are reallocated to extend the random number. For example, if the random number is allocated 32 bits, and the 20 bits conventionally used for the six last call digits are reallocated to the random number, according to example embodiment a random number of about 52 bits is provided. The 52 bits including the 32 bits used normally and the 20 reallocated bits.

In response to receiving the a communication including a random number, a call type indicator indicating a call origination, and six digits, the UIM calculates an authorization response AUTHR and keys using the extended random number, which may include about 52-bits based on the assumptions specified above.

Figure 10:
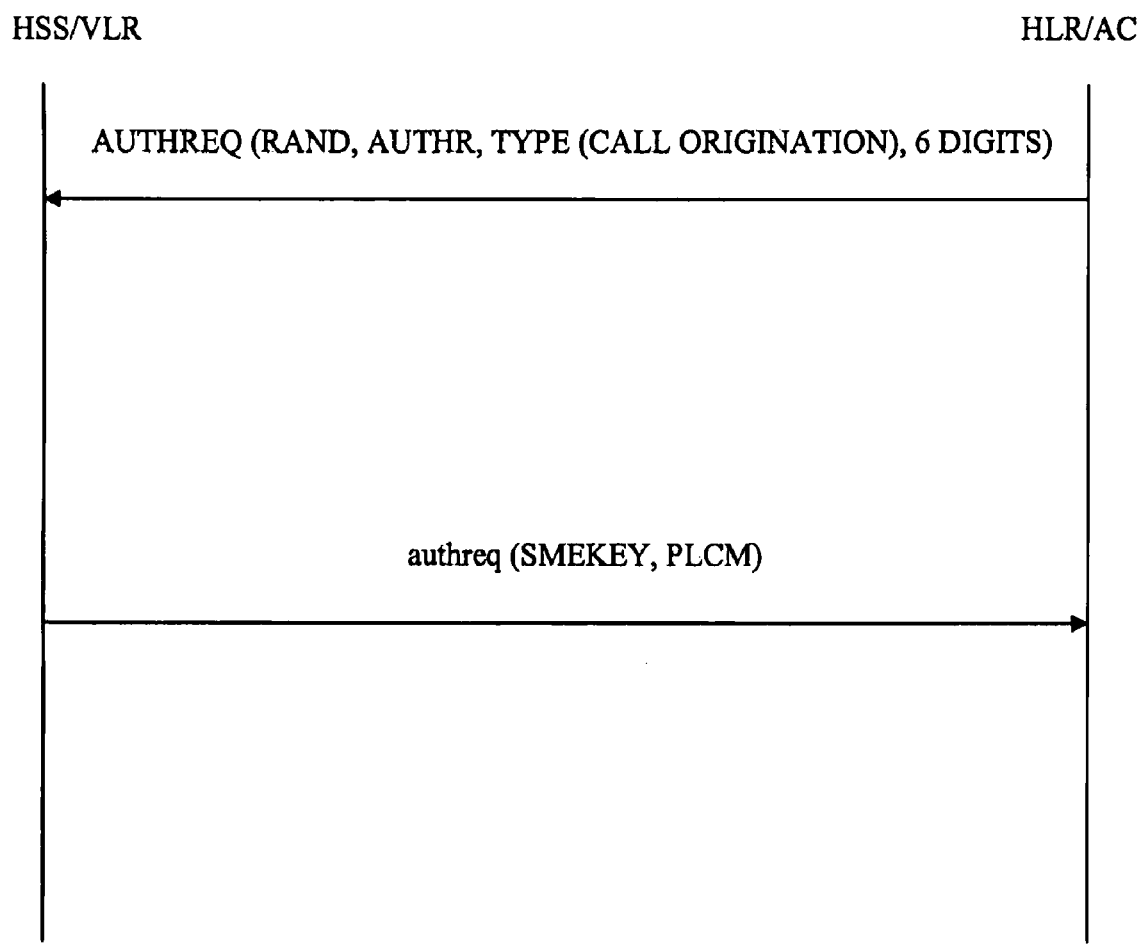
FIG. 10 is a signal flow diagram illustrating yet another example embodiment of method performed by the network.

FIG. 10 illustrates an example embodiment of method performed by the HSS/VLR and the HLR/AC of the network 20. As shown in FIG. 10, the HSS/VLR sends a communication AUTHREQ including a random number RAND, an authorization response AUTHR, a call type indicator indicating a call origination, six digits encoded in about 20 bits normally allocated to the last 6 call digits to the HLR/AC. Because the call type is designated as a call origination, the bits normally for the six call digits are reallocated to extend the random number. In response to receiving the communication including a random number, the call type indicator indicating a call origination, the six digits, and the authorization response, the HLR/AC calculates the keys essentially using the extended random number, which may include about 52-bits based on the assumptions specified above.

According to yet another example embodiment, a challenge is created by setting the call digits to a value a user would probably never enter and establish a call with. For example, certain values of call digits, such as six 0 digits, for example, rarely or never are used. Another example of rarely used values for the six digits is 01101 since 011 is used in many places in the world to place an international call and thus, it is unlikely that a 011 will be followed by another 011 or 01. According to this embodiment, the challenge may be a 32 bit random number RAND or a sequence number. Since a CDMA call would not likely be placed using call digits 01101, then no SMEKEY or PLCM keys would be created with any of the random challenges. Hence, a predictable sequence number with a rarely used call digit pattern may be used according to this example embodiment. By providing a newly created protocol using such a random number and call digit combination, this example embodiment ensures the new protocol uses random number and call digit combination securely.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

I claim:

1. A method performed by a mobile equipment to communicate with a network that leverages ANSI-41 security protocols, the method comprising:
   receiving a first challenge from the network, the first challenge having associated last call digits, the last call digits being a number that is not callable by the mobile equipment;
   calculating a network authorization response and network keys based on the received first challenge, the bits of the last call digits, and a value of a secret key stored in a user identity module (UIM) of the mobile equipment;
   generating a second challenge;
   calculating a mobile authorization response and mobile keys based on the generated second challenge, the last call digits, and the value of the secret key stored in the UIM of the mobile equipment; and
   obtaining an authentication key based on the mobile keys and the network keys calculated by mobile equipment.

2. The method of claim 1, further comprising:
   generating a mobile authentication code based on the authentication key;
   sending the second challenge, the network authorization response, the mobile authorization response, and the mobile authentication code to the network;
   receiving a network message authentication code from the network;
   generating a network message authentication code based on the first challenge and the authentication key; and
   establishing a communication channel between the mobile equipment and the network if the network message authentication code received from the network matches the network message authentication code generated at the mobile equipment.

3. The method of claim 1, wherein the UIM of the mobile equipment calculates the network authorization response and network keys using the first challenge and a value of a secret key stored in the UIM of the mobile equipment, and calculates the mobile authorization response and mobile keys using the second challenge and a value of a secret key stored in the UIM of the mobile equipment.

4. The method of claim 1, wherein the mobile keys and the network keys include a PLCM and SMEKEY, the authentication key includes a hash of the mobile keys and the network keys, and the first and second challenges are first and second random numbers.

5. The method of claim 1, wherein the UIM of the mobile equipment receives the first challenge along with a call type indicator indicating a call origination and last call digits, bits of the last call digits being allocated to the first challenge to effectively increase a length of the first challenge, and calculates the network authorization response and the network keys using the first challenge, the bits of the last call digits, and a value of a secret key stored in the UIM of the mobile equipment, and receives the second challenge along with the call type indicator indicating a call origination and last call digits, bits of the last call digits being allocated to the second challenge to effectively increase a length of the second challenge, and calculates the mobile authorization response and the mobile keys using the second challenge, the bits of the last of the last call digits, and a value of a secret key stored in the UIM of the mobile equipment.

6. The method of claim 1, wherein at least one of a pair of the first challenge and network authorization response and a pair of the second challenge and mobile authorization response are used in a subsequent protocol run to generate a PLCM and SMEKEY.

7. A method performed by a mobile equipment to communicate with a network that leverages ANSI-41 security protocols, the method comprising:
   generating a first challenge;
   calculating a mobile authorization response and mobile keys based on the generated first challenge, bits of a last call digits received by a user identity module (UIM) of the mobile equipment, and a value of a secret key stored in the UIM of the mobile equipment, the last call digits being a number that is not callable by the mobile equipment;
   sending the first challenge and the mobile authorization response to the network;
   receiving a second challenge along with the last call digits from the network;
   calculating a network authorization response and network keys based on the second challenge, the last call digits, and the value of the secret key stored in the UIM of the mobile equipment; and
   generating an authentication key based on the mobile keys and network keys calculated by the mobile equipment.

8. The method of claim 7, further comprising:
   receiving a network message authentication code from the network;
   generating a network message authentication code at the mobile based on the second challenge and the authentication key;
   generating a mobile message authentication code if the generated network message authentication code matches the received network message authentication code; and
   sending the mobile message authentication code to the network in an attempt to establish a mutually authenticated communication channel with the network.

9. The method of claim 7, wherein the UIM of the mobile equipment calculates the mobile authorization response and mobile keys using the first challenge and a value of a secret key stored in the UIM of the mobile equipment, and calculates the network authorization response and network keys using the second challenge and a value of a secret key stored in the UIM of the mobile equipment.

10. The method of claim 7, wherein the mobile keys and the network keys include a PLCM and SMEKEY, the authentication key includes a hash of the mobile keys and the network keys, and the first and second challenges are first and second random numbers.

11. The method of claim 7, wherein the UIM of the mobile equipment receives the first challenge along with a call type indicator indicating a call origination and call digits, bits of the call digits being allocated to the first challenge to effectively increase a length of the first challenge, and calculates the mobile authorization response and the mobile keys using the first challenge, the additional bits, and a value of a secret key stored in the UIM of the mobile equipment, and receives the call type indicator indicating a call origination and additional bits allocated to the second challenge to effectively increase a length of the second challenge along with the second challenge, and calculates the network authorization response and the network keys using the second challenge, the additional bits allocated to the second challenge, and a value of a secret key stored in the UIM of the mobile equipment.

12. The method of claim 7, wherein at least one of a pair of the first challenge and mobile authorization response and a pair of the second challenge and network authorization response are used in a subsequent protocol run to generate a PLCM and SMEKEY.

13. A method performed by a network to communicate with a mobile equipment that leverages ANSI-41 security protocols, the method comprising:
    sending a first challenge and last call digits to the mobile equipment, the last call digits being a number that is not callable by the mobile equipment;
    receiving a network authorization response, a second challenge, the last call digits and a mobile authorization response from the mobile equipment, the network authorization response being based on the first challenge, the last call digits, and a value of a secret key associated with the mobile equipment;
    calculating network keys based on the network authorization response received from the mobile, the last call digits, a value of a secret key stored in an authentication center associated with the network and the first challenge;
    calculating mobile keys based on the second challenge, the last call digits, the value of the secret key stored in the authentication center and the mobile authorization response; and
    generating an authentication key based on the networks keys and the mobile keys calculated by the network.

14. The method of claim 13, further comprising:
    receiving a mobile message authentication code from the mobile equipment; generating a mobile message authentication code at the network based on the second challenge and the authentication key;
    generating an network message authentication code if the generated mobile message authentication code matches the mobile message authentication code received from the mobile equipment; and
    sending the network message authentication code to the mobile equipment in an attempt to establish a mutually authenticated communication channel with the mobile equipment.

15. The method of claim 13, wherein the mobile keys and the network keys include a PLCM and SMEKEY, the authentication key includes a hash of the mobile keys and the network keys, and the first and second challenges are first and second random numbers.

16. The method of claim 13, wherein the authentication center of the network receives the first challenge along with a call type indicator indicating a call origination and last call digits, bits of the last call digits being allocated to the first challenge to effectively increase a length of the first challenge, and calculates the network authorization response and the network keys using the first challenge, the last call digits, and a value of a secret key stored in the authentication center of the network, and receives the second challenge along with call type indicator indicating a call origination and last call digits, bits of the last call digits being allocated to the second challenge to effectively increase a length of the second challenge, and calculates the mobile authorization response and the mobile keys using the second challenge, the last call digits, and a value of a secret key stored in the authentication center.

17. A method performed by a network to communicate with a mobile equipment that leverages ANSI-41 security protocols, the method comprising:
    receiving a first challenge, last call digits and a mobile authorization response, the last call digits being a number that is not callable by the mobile equipment;
    calculating mobile keys based on the first challenge, the last call digits, a value of a secret key stored in the authentication center associated with the network and the mobile authorization response;
    generating a second challenge and a network authorization response;
    calculating network keys based on the second challenge, the last call digits, the value of the secret key stored in the authentication center and the network authorization response; and
    generating an authentication key based on the mobile keys and network keys calculated by the network.

18. The method of claim 17, further comprising:
    generating a network message authentication code based on the second challenge and the authentication key;
    sending the second challenge and the network message authentication code to the mobile equipment;
    receiving a mobile message authentication code from the mobile equipment;
    generating a mobile message authentication code at the network based on the first challenge and the authentication key; and
    establishing a mutually authenticated communication channel with the mobile equipment if the received mobile message authentication code matches the mobile message authentication code generated at the network.

19. The method of claim 17, wherein generating the second challenge and the network authorization response comprises:
    sending a unique challenge request from a HSS/VLR to a HLR/AC of the network;
    receiving unique random number and a network authorization response from the HLR/AC of the network; and
    concatenating the unique random number with a mobile equipment identification number to generate the second challenge.

20. The method of claim 16, wherein the mobile keys and the network keys include a PLCM and SMEKEY, the authentication key includes a hash of the mobile keys and the network keys, and the first challenge and the second challenge are a first random number and a second random number.

21. The method of claim 17, wherein the authentication center of the network receives a call type indicator indicating a call origination and additional bits allocated to the first challenge to effectively increase a length of the first challenge along with the first challenge, and calculates the mobile authorization response and the mobile keys using the first challenge, the additional bits, and a value of a secret key stored in the authentication center, and receives the call type indicator indicating a call origination and additional bits allocated to the second challenge to effectively increase a length of the second challenge along with the second challenge, and calculates the network authorization response and the network keys using the second challenge, the additional bits allocated to the second challenge, and a value of a secret key stored in the authentication center.

* * * * *